United States Patent [19]

Buse

[11] Patent Number: 5,683,185
[45] Date of Patent: Nov. 4, 1997

[54] JOURNAL BEARING RETAINER SYSTEM WITH ECCENTRIC LOCK

[75] Inventor: Frederic W. Buse, Allentown, Pa.

[73] Assignee: Ingersoll-Dresser Pump Company, Liberty Corner, N.J.

[21] Appl. No.: 698,418

[22] Filed: Aug. 15, 1996

[51] Int. Cl.[6] .............................. F16C 33/02; F16C 23/10
[52] U.S. Cl. ................................ 384/295; 384/255
[58] Field of Search ................................ 384/255, 295, 384/296, 428, 439, 907, 447, 538, 903

[56] References Cited

U.S. PATENT DOCUMENTS

| | | |
|---|---|---|
| 395,428 | 1/1889 | Dobson . |
| 1,220,991 | 3/1917 | McGinley . |
| 2,428,177 | 9/1947 | Phillips . |
| 2,859,058 | 11/1958 | Traugott . |
| 3,007,753 | 11/1961 | Potter .............................. 384/538 |
| 3,355,197 | 11/1967 | Tessmer . |
| 3,623,782 | 11/1971 | Nakanishi et al. . |
| 4,027,933 | 6/1977 | Taylor . |
| 4,134,175 | 1/1979 | Contoyanis ...................... 384/296 X |
| 4,252,059 | 2/1981 | Simeth . |
| 4,421,187 | 12/1983 | Shibata et al. . |
| 4,659,240 | 4/1987 | Rogus . |
| 4,725,152 | 2/1988 | Heinrich et al. . |
| 4,871,301 | 10/1989 | Buse .............................. 417/420 |
| 4,968,055 | 11/1990 | Reilly ............................. 384/295 |
| 5,056,939 | 10/1991 | Buse .............................. 384/295 |

*Primary Examiner*—Thomas R. Hannon
*Attorney, Agent, or Firm*—Steven J. Rosen; Robert F. Palermo

[57] ABSTRACT

A bearing retainer system includes a hollow cylindrical bearing casing having a casing bore with a first axis for holding a bearing sleeve; an annular outer element rotationally secured to the casing, disposed within the casing bore, and having a circumferential first periphery circumscribed about a second axis which substantially coincides with the first axis; a bearing sleeve mounted in the casing bore and having a cylindrical sleeve periphery circumscribed about a third axis which substantially coincides with the first axis; and an eccentric cylindrical locking apparatus for locking the bearing sleeve to the outer element. The locking apparatus includes cylindrical male and female eccentric annular elements that are eccentric annular in shape and axially disposed at opposite ends of an annular outer element. The male element has an eccentric cylindrical male outer surface which mates with an eccentric cylindrical female inner surface. The male and female outer and inner surfaces are eccentric with respect to the first axis and they are circumscribed about a second axis which is offset from the first axis. The bearing assembly is designed to hold a shaft having an axis of rotation substantially coinciding with the first axis.

13 Claims, 2 Drawing Sheets

JOURNAL BEARING RETAINER SYSTEM WITH ECCENTRIC LOCK

BACKGROUND OF THE INVENTION

This invention relates generally to journal bearings and, more specifically, to a retainer system for journal bearings. More particularly, this invention relates to a retainer system using eccentric ring elements for retaining Journal bearing sleeves.

DISCUSSION OF THE BACKGROUND ART

Journal shaft and bearing assemblies typically have shafts that have journals attached, which in turn are rotatably supported in bearing sleeves, which are held fixed relative to the shaft. Conventional bearing sleeves are installed in casing bores by methods such as pressing, shrink fitting, adhesives, and interference rings. Bearing sleeves installed using these methods are frequently not in proper alignment after installation and need to be machined in order to place them in proper alignment and so that they will not spin when the shaft's bearing journals spin with the shaft.

Bearing sleeves made of hard brittle materials such as silicon carbide have been found to be very advantageous. A bearing sleeve made of silicon carbide cannot be pressed into stainless steel because it galls the stainless steel. It cannot be machined and is subject to breaking under bending or tension stresses. It cannot be drilled or tapped which would be necessary for the use of screws to fasten it in a casing. Thus, it must be installed in correct alignment to avoid problems. A journal bearing retainer system disclosed in U.S. Pat. No. 5,056,939 was developed by the present inventor to overcome these limitations which were known to exist in similar prior art devices and design, construction, and assembly techniques. Star tolerance rings are also used to help align, center, and hold in place various ring elements that provide cooling and lubrication passages for the bearing.

The present invention is designed to provide an even better design with additional features and improvements as compared to the journal bearing retainer system disclosed in U.S. Pat. No. 5,056,939. It eliminates the special machining for the Woodruff key and the need for tolerance rings, their grooves, and set screws.

SUMMARY OF THE INVENTION

A bearing retainer system includes a hollow cylindrical bearing casing having a casing bore with a first axis for holding a bearing sleeve; an annular outer element rotationally secured to the casing, disposed within the casing bore, and having a circumferential first periphery circumscribed about a second axis which substantially coincides with the first axis; a bearing sleeve mounted in the casing bore and having a cylindrical sleeve periphery circumscribed about a third axis which substantially coincides with the first axis; and an eccentric cylindrical locking apparatus for locking the bearing sleeve to the outer element. In one embodiment, the locking apparatus includes a cylindrical male element on one mating end of the outer element or the bearing sleeve and a cylindrical female element on another mating end of the other one of the outer element or the bearing sleeve. The male element is disposed in the female element. The male element has an eccentric cylindrical male outer surface and the female element has an eccentric cylindrical female inner surface and the eccentric cylindrical male outer and female inner surfaces mate and are circumscribed around offset axes that are radially offset from respective ones of the second and third axis of the outer element and the bearing sleeve.

In a more particular embodiment of the present invention, the female element is a second bore through the outer element or the bearing sleeve such that the second bore is circumscribed about one of the offset axes. The male element includes an annular rabbet having the male outer surface along an annular wall of the other one of the outer element or the bearing sleeve and the annular rabbet is circumscribed about the other of the offset axes. In another embodiment of the present invention, the annular outer element may be rotationally secured to the casing by a press fit.

Another embodiment of the present invention is a bearing assembly having the hollow cylindrical bearing casing and first axis and the casing bore for holding a pair of bearing sleeves which are axially disposed at opposite ends of an annular outer spacer within the casing bore. A pair of bearing journals fixedly mounted on a shaft are rotatably journaled within corresponding ones of the bearing sleeves. The annular outer spacer is rotationally secured to the casing, disposed within the casing bore, and has a circumferential first periphery circumscribed about a second axis which substantially coincides with the first axis. The bearing sleeves have cylindrical sleeve peripheries circumscribed about a pair of third axes which substantially coincide with the first axis and an eccentric cylindrical locking apparatuses for locking the bearing sleeves to the outer spacer. The eccentric cylindrical locking apparatuses include a pair of the male elements on one pair of opposite ends of the outer spacer and pair of facing ends of the bearing sleeves and a pair of the female elements on another pair of opposite ends of the outer spacer and pair of facing ends of the bearing sleeves.

ADVANTAGES OF THE INVENTION

The present invention provides an advantage of allowing a more inexpensive bearing and bearing assembly to be constructed without using locking devices such as a Woodruff key that requires more extensive machining and more parts. The present invention has the advantage of providing anti-rotation for the bearing sleeves and distributing the anti-rotational force more evenly around the bearing sleeve, thus, decreasing the possibility of cracking the sleeves which are often made of hard brittle material. The present invention has an advantage of allowing the use of existing casings to be used since it requires no further machining of these casings and their bores.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
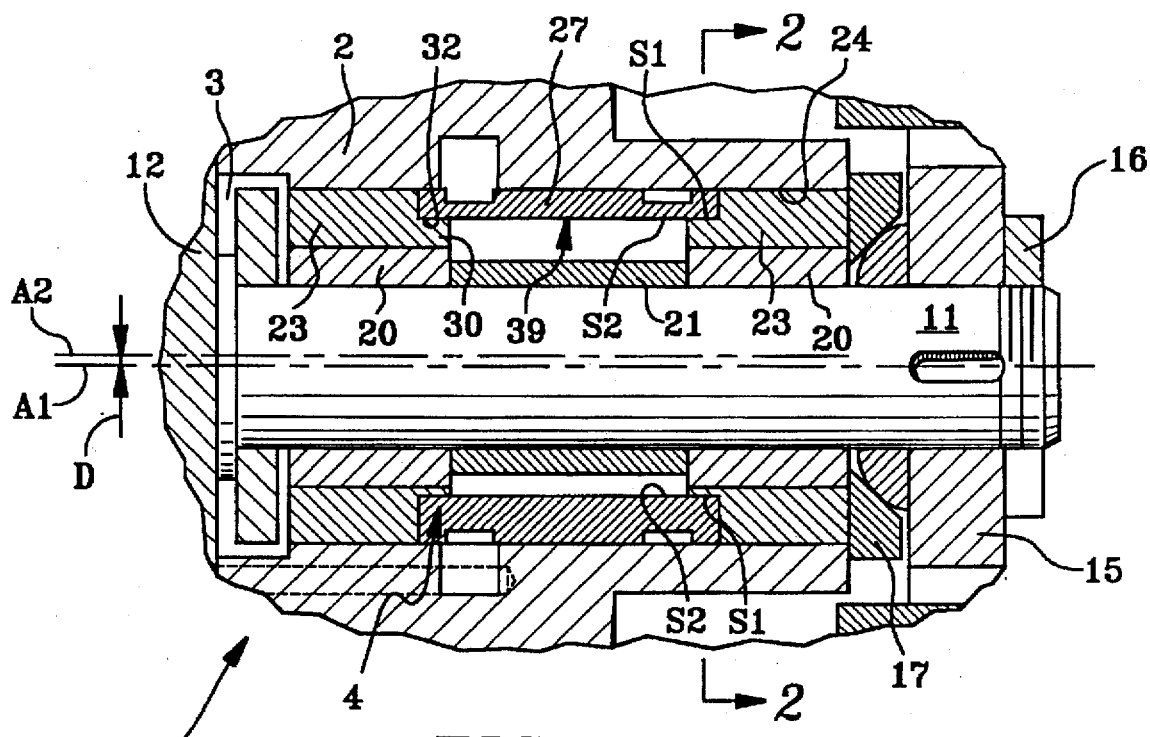
FIG. 1 is a cut away view of an axial section of a seal-less type of centrifugal pump taken along the axis of the pump shaft and illustrating the present invention used in the mounting of journal bearings for a pump shaft.

Referring now to the drawings in detail, wherein identical numerals indicate the same elements throughout the figures.

Figure 2:
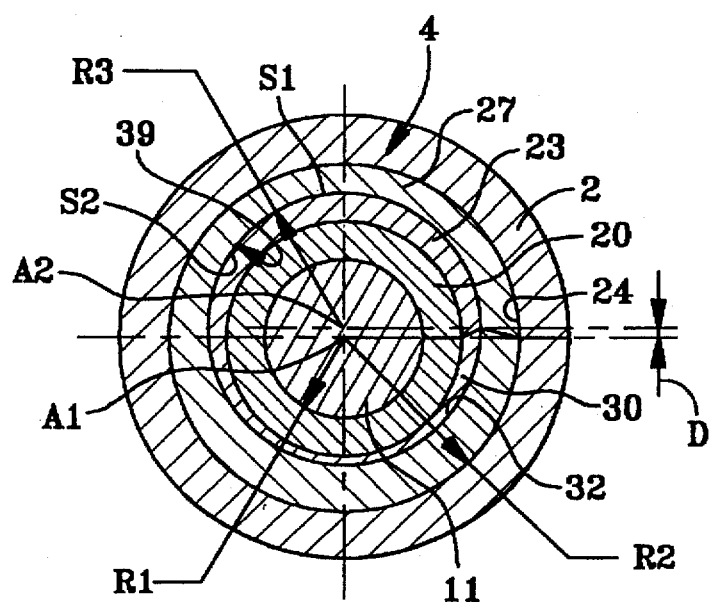
FIG. 2 is a cross-section of FIG. 1 taken along line 2—2 in FIG. 1.
Figure 3:
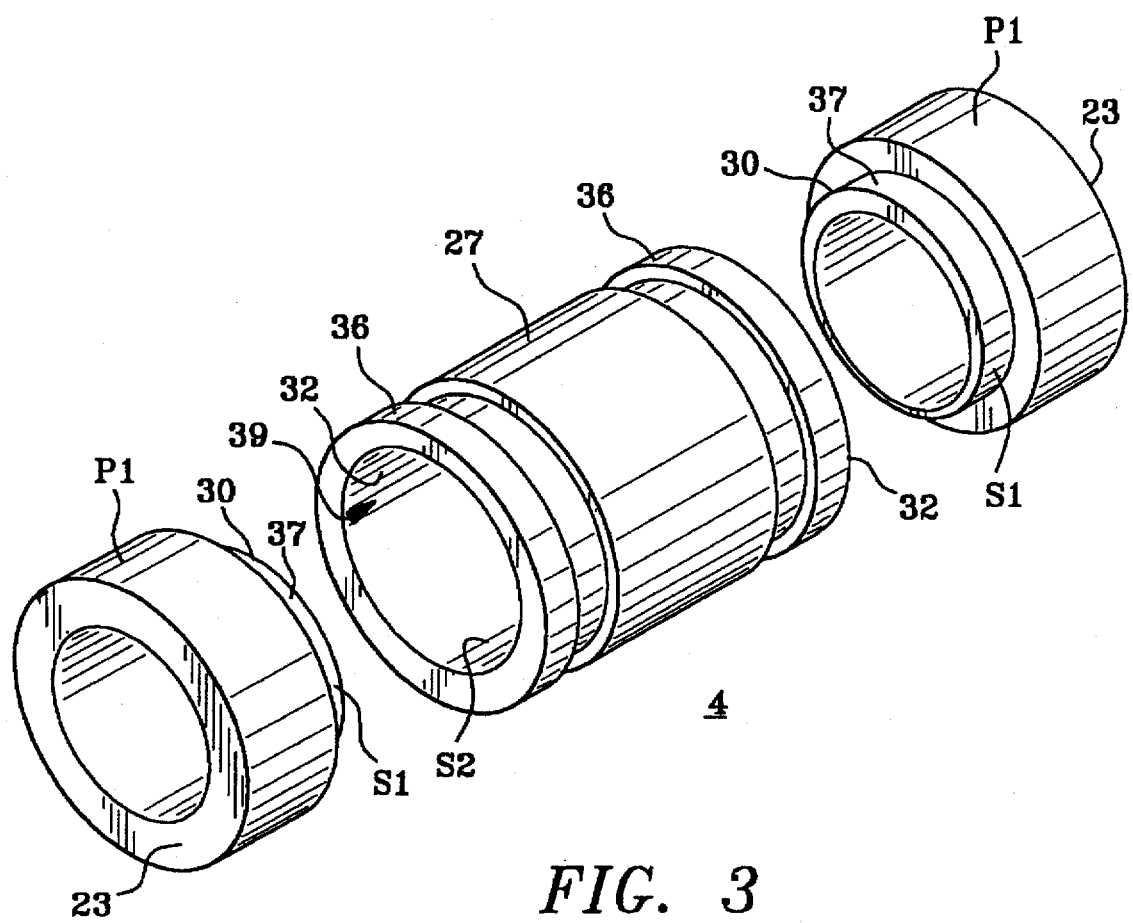
FIG. 3 is an exploded perspective view of the bearing sleeves axially disposed at opposite ends of the annular outer spacer in FIG. 1.

FIGS. 1 through 3 illustrate an exemplary embodiment of the present invention, a bearing retainer system 4 in a pump 1 (shown partly in FIG. 1) which includes a casing 2 enclosing a bearing chamber 3 and containing an axially extending shaft 11 disposed in a casing bore 24 and connected to an pump impeller 12, which may be open, semi-open, or enclosed, rotating in the bearing chamber 3. Further details of this type of pump are disclosed in U.S. Pat. No. 4,871,301, issued Oct. 3, 1989, titled "Centrifugal Pump Bearing Arrangement", invented by the present inventor Frederic W. Buse. The casing bore 24 has a first axis A1 which substantially coincides with a shaft axis (not separately pointed out) of the shaft 11.

An end of the shaft 11 opposite from the impeller 12 carries a drive rotor 15 keyed thereon and held in place by a nut 16. A thrust bearing 17 is located between the nut 16 and the casing 2. The shaft 11 carries a pair of bearing journals 20 separated by an inner spacing sleeve 21. The bearing journals 20 are fixed on the shaft 11.

The bearing journals 20 rotate in a corresponding pair of bearing sleeves 23 are seated within a casing bore 24 of the casing 2, wherein they are locked against rotating within the casing bore. Each of the bearing sleeves 23 has an outer cylindrical sleeve periphery P1 which is circumscribed about a bearing sleeve axis which also substantially coincides with the first axis A1 and, therefore, is also not separately indicated. Normally, the bearing sleeves 23 are made of a hard material, such as silicon carbide which cannot be easily machined. The present invention provides a means for anti-rotationally mounting the bearing sleeves 23 in the casing 2. The invention may also be used in conjunction with bearing sleeves 23 are made of polyimides or having coatings such as those made of chrome oxides.

Each bearing sleeve 23 must be prevented from rotating in the casing bore 24 while being held against moving axially in the casing bore 24. The impeller 12 and the thrust bearing 17 prevent the bearing sleeves 23 from moving outward toward the ends of the shaft 11 and the bearing mounting system of this invention prevents the two bearing sleeves from moving axially toward each other on the shaft 11.

The bearing sleeve 23 are axially disposed at opposite ends of an annular outer spacer 27 which is rotationally secured to the casing by a suitable means such as an interference fit such as a press fit or screw or other similar means. Each bearing sleeve 23 has its own bearing retainer means in the form of an eccentric cylindrical locking means having mating cylindrical eccentric annular male elements 30 and female elements 32 into which the male elements are received. The term eccentric annular is used herein to describe a cross-sectional area between two non concentric circles wherein once circle lies within the other and each circle is circumscribed about a different center and the two centers are offset from each other. The shaft 11 has first radius R1 and the casing bore 24 has second radius R2 both of which substantially have the first axis A1 as their center. The male and female eccentric annular elements 30 and 32, respectively, are annular in shape and axially disposed at opposite ends 36 of the annular outer spacer 27. The male element 30 has an eccentric cylindrical male outer surface S1 which mates with an eccentric cylindrical female inner surface S2 of said female element 32. The male and female outer and inner surfaces S1 and S2, respectively, are cylindrical with circular cross-sections and eccentric with respect to the first axis A1 of the shaft 11 in that they have a second axis A2 about which the male and female outer and inner surfaces are circumscribed and which is offset from the first axis by an offset distance d. The male outer and the female inner surfaces S1 and S2, respectively, are substantially both circumscribed about the second axis A2 at a third radius R3 as shown in FIG. 2. The male element 30 can be viewed as an annular rabbet 37 having the eccentric cylindrical male outer surface S1 at a distance equal to the third radius R3 from the second axis A2. The female element 32 eccentric cylindrical female can be viewed as a second bore 39 having the inner surface S2 and which may be the bore of the annular outer spacer 27 also located a distance equal to the third radius R3 from the second axis A2.

The male elements 30 are illustrated as being on the bearing sleeves 23 and the female elements 32 on the annular outer spacer 27, however, it is easily seen how this can be reversed with the male elements on the annular outer spacer. The mating male elements and female elements 30 and 32, respectively, can easily be formed by machining or casting with surface finishing in the materials, including materials such as silicon carbide, commonly used for such bearing assemblies. The bearing sleeves 23 are mounted loosely in the casing bore 24 which allows the bearing sleeve 23 to adjust itself to proper alignment upon the installation of the shaft 11 with journals 20. Small tolerances between the male outer surface S1 and the female inner surfaces S2 are provided to allow the bearing sleeve 23 to adjust itself to proper alignment upon the installation of the journals 20. Annular and axial and/or radial grooves may be used on the annular outer spacer 27 to supply lubricant to the bearing sleeves and journals.

While the preferred embodiment of our invention has been described fully, in order to explain its principles, it is understood that various modifications or alterations may be made to the preferred embodiment without departing from the scope of the invention as set forth in the appended claims.

What is claimed is:

1. A bearing retainer system comprising:
   a hollow cylindrical bearing casing having a first axis and a casing bore;
   an annular outer element rotationally secured to said casing, disposed within said casing bore, and having a circumferential first periphery circumscribed about a second axis which substantially coincides with said first axis;
   a bearing sleeve mounted in said casing bore and having a cylindrical sleeve periphery circumscribed about a third axis which substantially coincides with said first axis; and
   an eccentric cylindrical locking means for locking said bearing sleeve to said outer element.

2. A bearing retainer system as claimed in claim 1 wherein said locking means comprises:
   a cylindrical eccentric annular male element on one mating end of one of said outer element and said bearing sleeve and a cylindrical eccentric annular female element on another mating end of the other of said outer element and said bearing sleeve, wherein said male element is disposed in said female element;
   said male element has an eccentric cylindrical male outer surface and said female element has an eccentric cylindrical female inner surface; and
   said eccentric cylindrical male outer and female inner surfaces mate and are circumscribed around offset axes that are radially offset from respective ones of said second and third axis of said outer element and said bearing sleeve respectively.

3. A bearing retainer system as claimed in claim 2 wherein:

said female inner surface is on a second bore through one of said outer element and said bearing sleeve wherein said second bore is circumscribed about one of said offset axes; and said male outer surface is on an annular rabbet along an annular wall of one of said outer element and said bearing sleeve wherein said annular rabbet is circumscribed about another of said offset axes.

4. A bearing retainer system as claimed in claim 3 wherein said annular outer element is rotationally secured to said casing by a press fit.

5. A bearing retainer system as claimed in claim 3 wherein:

said annular outer element is an outer spacer disposed between two bearing sleeves mounted in said casing bore;

each bearing sleeve having a cylindrical sleeve periphery circumscribed about a third axis which substantially coincides with said first axis;

a pair of male elements comprising two of said male element, said pair of male elements on one of a pair of opposite ends of said outer spacer and a pair of facing ends of said bearing sleeves;

a pair of female elements comprising two of said female element, said pair of female elements on the other pair of said opposite ends of said outer spacer and said pair of facing ends of said bearing sleeves, wherein said male elements are correspondingly disposed in said female elements;

said male elements have eccentric cylindrical male outer surfaces and said female elements have eccentric cylindrical female inner surfaces; and said male outer surfaces and female inner surfaces are circumscribed about offset axes that are radially offset from respective ones of said second and third axis of said outer spacer and said bearing sleeves respectively.

6. A bearing retainer system as claimed in claim 5 wherein said outer spacer is rotationally secured to said casing by a press fit.

7. A bearing retainer system as claimed in claim 6 wherein:

said female elements comprise outer spacer bores through one of said outer spacer and said bearing sleeves wherein said spacer bores are circumscribed about one of said offset axes; and said male elements comprise annular rabbets around said opposite ends on an annular outer spacer wall of said outer spacer and annular bearing sleeve walls of said facing ends of said bearing sleeves wherein said annular rabbets are circumscribed about another of said offset axes.

8. A bearing retainer system as claimed in claim 7 wherein sleeves include material comprising silicon carbide.

9. A bearing assembly comprising:

a hollow cylindrical bearing casing having a first axis and a casing bore for holding a pair of bearing sleeves which are axially disposed at opposite ends of an annular outer spacer within said casing bore;

a pair of bearing journals fixedly mounted on a shaft are rotatably journaled within corresponding ones of said bearing sleeves;

said annular outer spacer is rotationally secured to said casing, disposed within said casing bore, and having a circumferential first periphery circumscribed about a second axis which substantially coincides with said first axis;

said bearing sleeves have cylindrical sleeve peripheries circumscribed about a pair of third axes which substantially coincide with said first axis; and an eccentric cylindrical locking means for locking said bearing sleeves to said outer spacer.

10. A bearing assembly as claimed in claim 9 wherein said locking means comprises:

a pair of cylindrical eccentric annular male elements on one of a pair of opposite ends of said outer spacer and a pair of facing ends of said bearing sleeves;

a pair of female elements on the other pair of said opposite ends of said outer spacer and said pair of facing ends of said bearing sleeves, wherein said male elements are correspondingly disposed in said female elements;

said male elements have eccentric cylindrical male outer surfaces and said female elements have eccentric cylindrical female inner surfaces; and said male outer surfaces and female inner surfaces are circumscribed about offset axes that are radially offset from respective ones of said second and third axis of said outer spacer and said bearing sleeves respectively.

11. A bearing assembly as claimed in claim 10, wherein:

said female elements comprise at least one second bore through one of said outer spacer and said bearing sleeves wherein said second bore is circumscribed about one of said offset axes; and said male elements comprise annular rabbets around said opposite ends on an annular outer spacer wall of said outer spacer and annular bearing sleeve walls of said facing ends of said bearing sleeves wherein said annular rabbets are circumscribed about another of said offset axes.

12. A bearing assembly as claimed in claim 11, wherein said annular outer spacer is rotationally secured to said casing by a press fit.

13. A bearing assembly as claimed in claim 12 wherein said sleeves include material comprising silicon carbide.

* * * * *